United States Patent [19]
Anscher

[11] Patent Number: 5,671,505
[45] Date of Patent: Sep. 30, 1997

[54] PRELOADABLE CORD LOCK REQUIRING LESS FORCE TO PRELOAD AND TO ACTUATE

[75] Inventor: Joseph Anscher, Muttontown, N.Y.

[73] Assignee: National Molding Corp., Farmingdale, N.Y.

[21] Appl. No.: 647,536

[22] Filed: May 15, 1996

[51] Int. Cl.⁶ .................................................. F16G 11/00
[52] U.S. Cl. ...................................... 24/115 G; 24/136 R
[58] Field of Search .............................. 24/115 G, 136 R, 24/115 M, 136 K, 115 H

[56] References Cited

U.S. PATENT DOCUMENTS

| | | | |
|---|---|---|---|
| 5,222,279 | 6/1993 | Frano et al. | 24/625 |
| 5,361,461 | 11/1994 | Anscher | 24/115 G |
| 5,451,082 | 9/1995 | Murai | 24/115 G X |

Primary Examiner—James R. Brittain
Attorney, Agent, or Firm—Kenyon & Kenyon

[57] ABSTRACT

A preloadable cord lock for gripping a cord such as an elastic shock cord, includes a pair of telescoping members having apertures defined therethrough. The telescoping members are biased so that their respective apertures are not aligned. The lock can be preloaded to a condition where the apertures are aligned for feeding a cord through the apertures. The preloading mechanism may then be disengaged which will cause the telescoping members to be urged to a position where their apertures are not aligned by the bias of the device, thereby pinching and locking the cord in place. Because of unique positioning of shoulders on the inner telescoping member with respect to the arms of the inner telescoping member, the cord lock is easy to preload and actuate, thereby avoiding finger muscle fatigue.

12 Claims, 7 Drawing Sheets

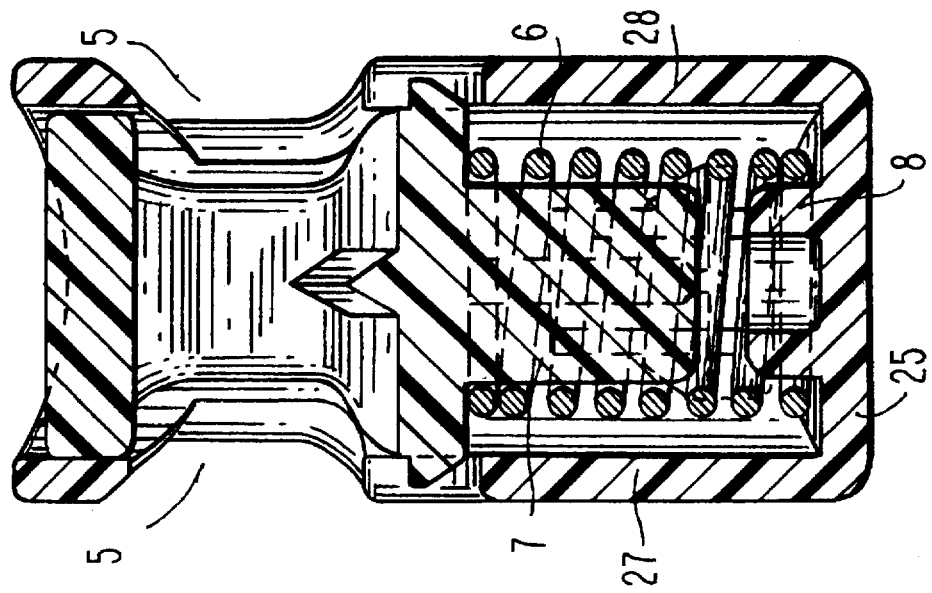
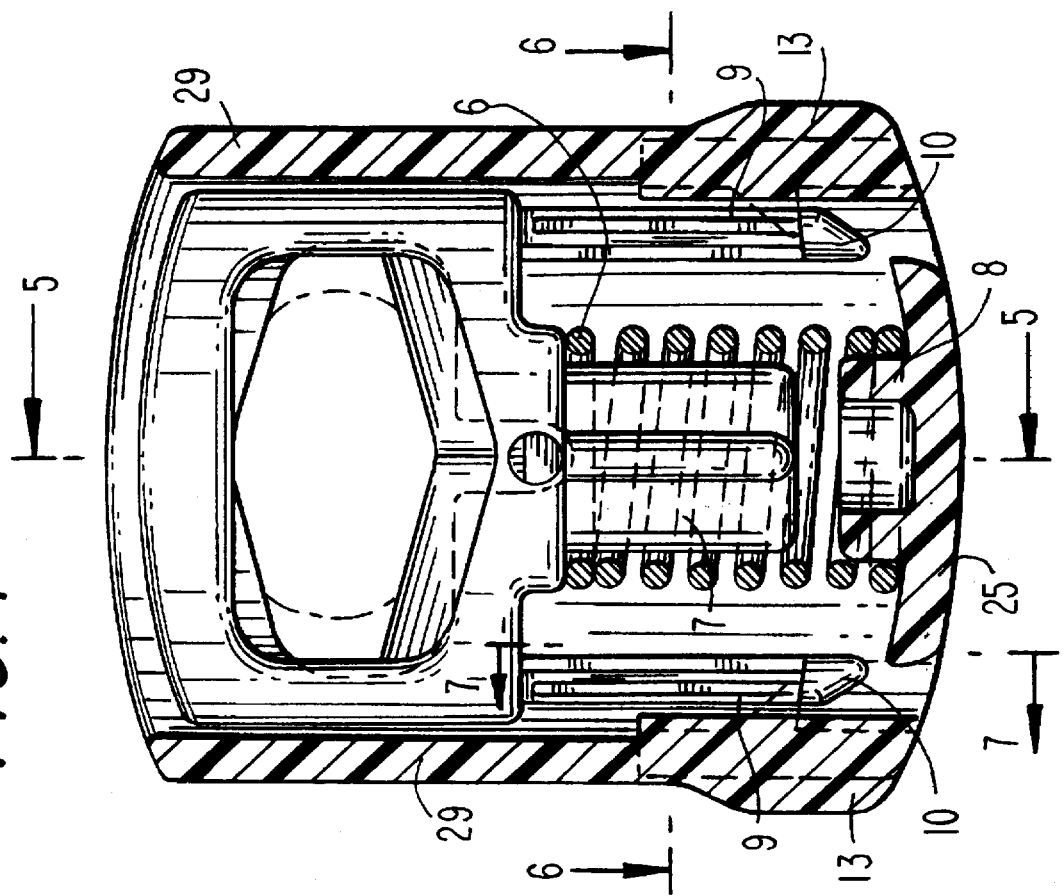

PRELOADABLE CORD LOCK REQUIRING LESS FORCE TO PRELOAD AND TO ACTUATE

BACKGROUND OF THE INVENTION

1. Field of the Invention

The invention relates generally to cord locks and holders, for example, for use with luggage, baggage, baggage carriers, etc. More particularly, the invention relates to a new cord lock which can be preloaded for ready use by applying less force than the prior art, and which can be subsequently actuated using less force than the prior art.

2. Description of Related Art

Cord locks are known in the art for gripping and retaining cord, for example, an elastic shock cord, under tension. Such devices typically include a pair of telescoping members which have apertures therethrough. One telescoping member is biased with respect to the other, so that their respective apertures are not aligned. In order to use the cord lock, it is necessary to load it by squeezing the two telescoping members together so that their respective apertures are aligned. The user must continue to apply pressure to hold the two members together in this aligned state while simultaneously threading the cord through the apertures. Once the cord is threaded, the user may release the pressure which is exerted on the two members. Because the two members are biased so that their apertures are misaligned, they will pinch the cord which has been threaded therethrough so as to retain the cord in a fixed position.

Although this design has proven to be effective in holding and locking a cord, such as an elastic shock cord, one principal disadvantage is that the user must continue to exert pressure to align the apertures of the two telescoping members while simultaneously threading the cord through the apertures. Because the biasing force which is necessary to sufficiently grip the cord is relatively strong, a relatively large amount of finger pressure must be applied to align the apertures. Thus, it can be cumbersome to simultaneously thread the cord through the apertures while maintaining the apertures aligned (i.e., loading the device).

Another shortcoming of the prior art is that there is a risk that the lock can be inadvertently disengaged by someone squeezing the two telescoping members together, thereby relieving the tension on the cord and allowing the cord to slip. To minimize the risk of accidental disengagement, the prior art employs a very strong biasing means which requires a great amount of force to oppose. However, as discussed above, this makes the lock all the more difficult to load prior to threading of the cord.

In order to address these drawbacks, I had developed a cord lock which can be preloaded with its apertures aligned prior to use so that the user can easily thread a cord therethrough without the necessity of simultaneously applying pressure to the lock. This preloadable cord lock is described in my U.S. Pat. No. 5,361,461.

The preloadable cord lock of U.S. Pat. No. 5,361,461 includes a pair of telescoping members, each having an aperture defined therein, where the telescoping members can be preloaded to a position where the apertures are aligned and retained in this loaded position without the need to apply pressure to the device. A spring is provided for urging the apertures out of alignment, however, it is ineffective to cause such misalignment when the device is in the loaded state. The loaded condition is retained by a mechanism which includes a pair of engagement members provided on a pair of resiliently flexible arms of the inner telescoping member. These engagement members project laterally from the outer sides of the arms, and they cooperate with a corresponding set of engagement members provided on the inner surface of the sides of the outer telescoping member. The respective engagement members have cooperating inclined surfaces which permit one-way sliding travel of the inner telescoping member with respect to the outer telescoping member, namely, travel in the direction which brings the apertures of the telescoping members into alignment. The respective engagement members further include cooperating surfaces which preclude movement of the telescoping members relative to each other once the apertures are in an aligned condition. In the loaded state, the cord is fed through the aligned, or semi-aligned, apertures. The outer telescoping member includes a pair of tabs on opposite sides. Depression of the tabs inward forces the engagement members of the arms of the inner telescoping member inward and out of engagement with the engagement members of the outer telescoping member. This allows the inner and outer telescoping members to slide apart under the action of the spring. Of course, this movement is restricted by the cord which has been threaded through the aligned apertures. The force which is exerted by the spring against the cord causes the telescoping members to pinch and retain the cord in a fixed position under the force of friction.

The cord lock described in U.S. Pat. No. 5,361,461 was a great improvement over the prior art. However, although it was no longer necessary to simultaneously apply force to the cord lock while threading the cord through the apertures, it was still necessary to apply a relatively large amount of force to initially preload the cord lock.

In commercial practice, the cord locks are preloaded in great numbers by workers, prior to the shipment of the cord locks to customers. The preloading of hundreds of cord locks by a worker in a single day can cause great muscle fatigue on the fingers. In very extreme cases, workers must guard against carpal tunnel syndrome by not over exerting their fingers. Therefore, it would be desirable to provide a preloadable cord lock of the type described in U.S. Pat. No. 5,361,461 which is easier to preload, so that finger muscle fatigue can be minimized in commercial production facilities where very large numbers of cord locks must be preloaded.

SUMMARY OF THE INVENTION

Accordingly, it is an object of the invention to provide a preloadable cord lock of the type described by U.S. Pat. No. 5,361,461 which requires less force to preload.

It is a further object of the invention to provide such a cord lock which also requires less force to actuate.

These and other objects of the invention which will become apparent from the detailed description of the invention which follows are achieved by repositioning the engagement members which lock the inner and outer telescoping members of the cord lock of U.S. Pat. No. 5,361,461 in the loaded position. Because the engagement members belonging to the arms of the inner telescoping member of the cord lock of U.S. Pat. No. 5,361,461 project laterally from the outer sides of the arms, and because the cooperating engagement members belonging to the outer telescoping member project laterally from the inner surface of the outer telescoping member, a relatively large amount of force is required to slide these engagement members passed each other to preload the cord lock. In addition, a relatively large amount of force is required to disengage the engagement members and actuate the cord lock because the arms must be forced a relatively great distance inward to free the engagement surfaces from each other. It has now been discovered that the amount of force required to preload the cord lock and subsequently actuate the cord lock is reduced by relocating the engagement members belonging to the arms from the outer sides of the arms to the top and bottom surfaces of the arms. In this way, the engagement surfaces which hold the inner and outer telescoping members together in the loaded state are aligned, in the width direction, along the longitudinal axis through the arms of the inner telescoping member. This is advantageous because the arms will not have to flex inwardly to as great an extent when the engagement members are slid passed each other to preload the cord lock, thereby requiring less force to preload the cord lock. In addition, the arms will not have to be flexed inwardly to as great an extent when the engagement members are disengaged to actuate the cord lock. However, because the engagement force which holds the inner and outer telescoping members together in the preloaded state is more closely aligned, in the width direction, along the longitudinal axis of the arms of the inner telescoping member, premature separation of the inner and outer telescoping members, which could possibly be caused by the great force exerted by the spring, is avoided. This latter advantage will be explained in the detailed description of the invention which follows, in conjunction with the drawings.

BRIEF DESCRIPTION OF THE DRAWINGS

FIG. 3 is a cross-sectional view of the cord lock illustrated in FIG. 1, having a cord therethrough.

FIG. 4 is a cross-sectional view of the cord lock illustrated in FIG. 3 (without the cord) in the preloaded state, taken along the line 4—4.

FIG. 5 is a cross-sectional view of the cord lock illustrated in FIG. 4 in the preloaded state, taken along the line 5—5.

DETAILED DESCRIPTION OF THE INVENTION

Figure 1:
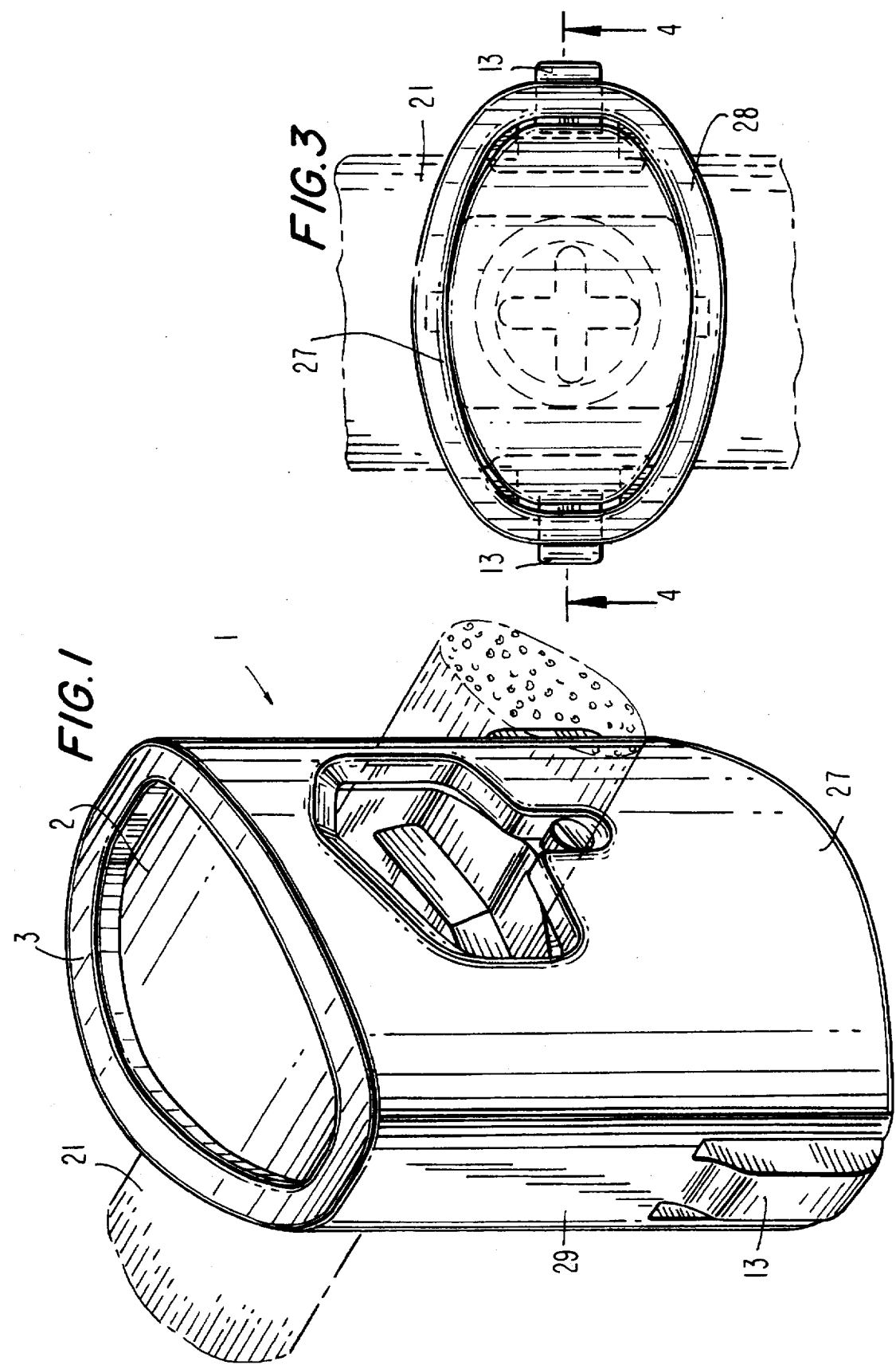
FIG. 1 is an enlarged perspective view of the cord lock of the invention, having a shock cord threaded therethrough.
Figure 2:
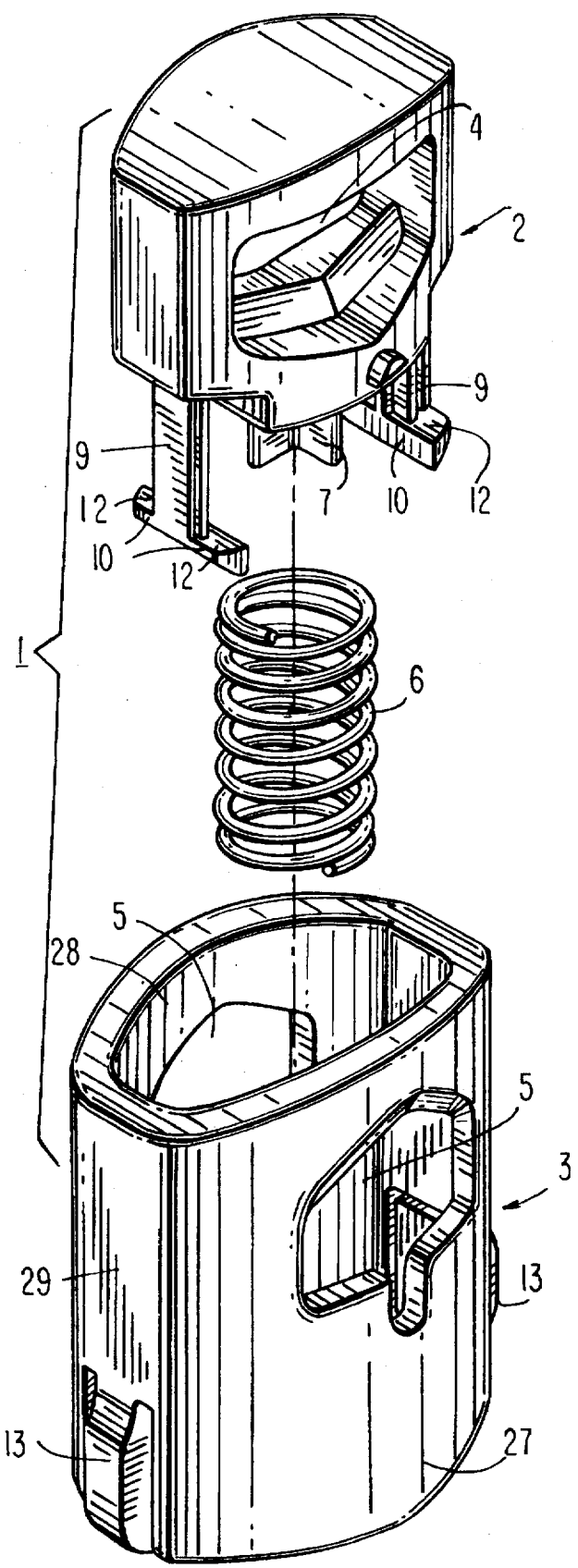
FIG. 2 is an exploded view of the cord lock of the invention.
Figure 6:
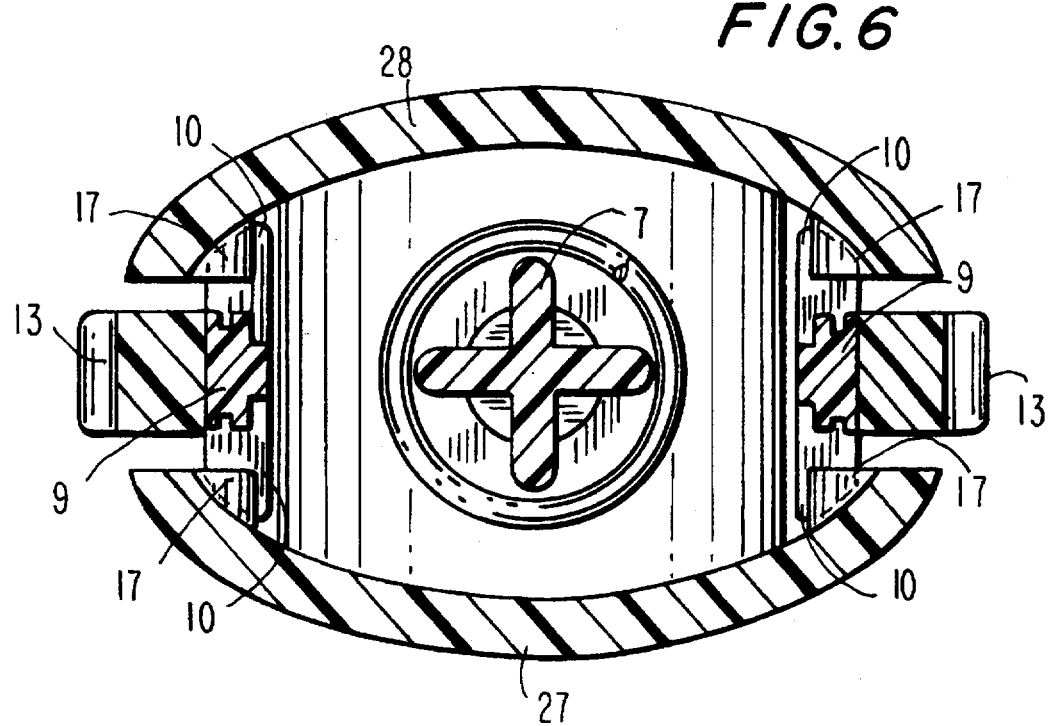
FIG. 6 is a cross-sectional view of the cord lock illustrated in FIG. 4 in the preloaded state, taken along the line 6—6.
Figure 10:
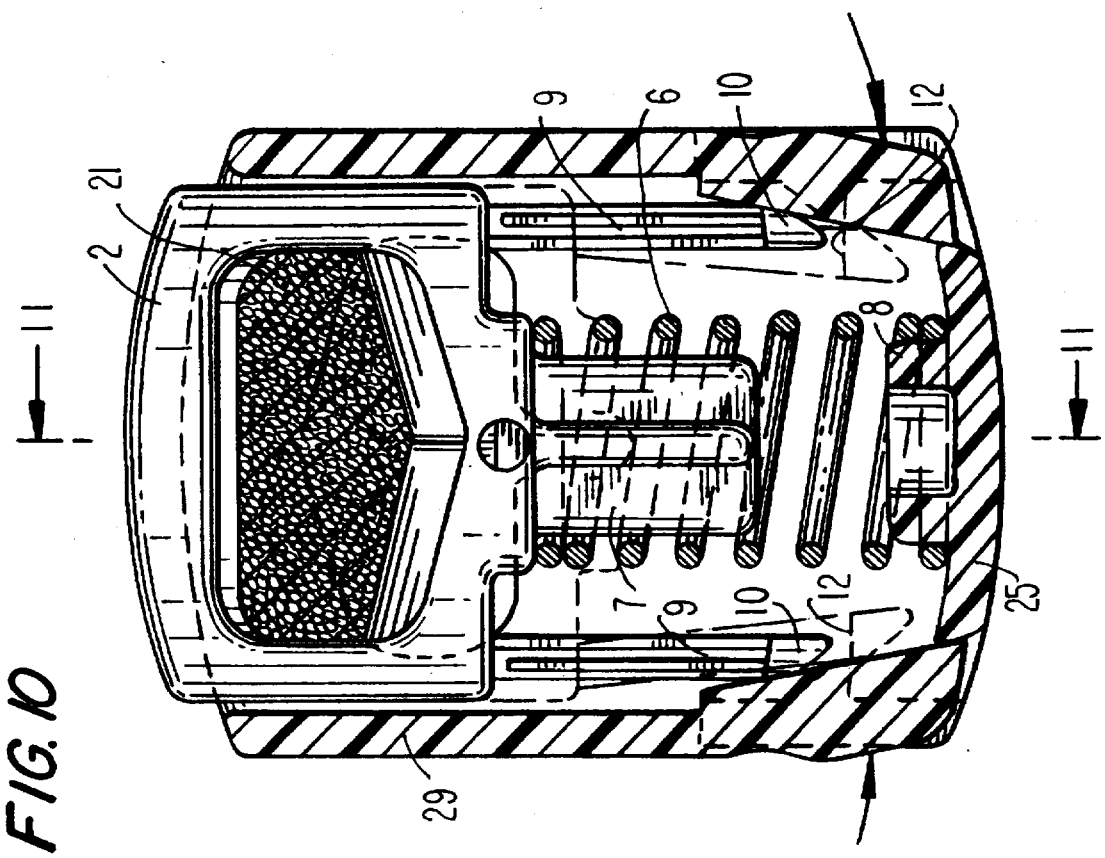
FIG. 10 is a cross-sectional view of the cord lock illustrated in FIG. 3, showing movement of the cord lock from the preloaded state (in phantom) to the locking position, taken along the line 4—4 of FIG. 3.
Figure 12:
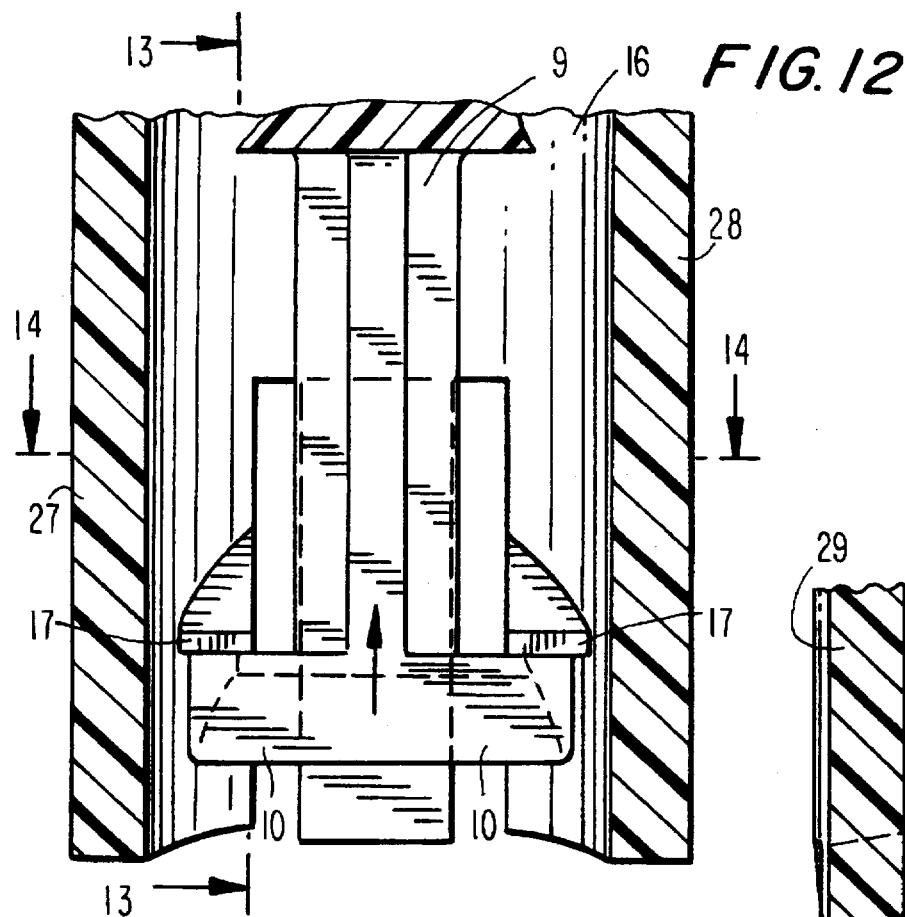
FIG. 12 is a cross-sectional, partial view of the cord 7 lock illustrated in FIG. 4, but with the arms flexed inward, taken along the line 7—7.

Referring to FIGS. 1 and 2, the cord lock generally illustrated at 1 includes an inner telescoping member 2 which is slidably received in an outer telescoping member 3. The telescoping members 2, 3 define an aperture 4, 5, respectively, therein. The inner and outer telescoping members are coupled by a biasing means such as a spring 6. The biasing means 6 biases the inner telescoping member 2 in a direction such that the respective apertures 4, 5 of the telescoping members are out of alignment or misaligned as illustrated in FIG. 10. The condition of FIG. 10 shall be referred to as an unloaded condition or a cord locking position. Any overlap in apertures 4 and 5 in this unloaded condition (preferably, the apertures are completely out of alignment so that no overlap is present) should be considerably smaller than the diameter of the cord 21 (see FIGS. 10 and 11) which is to be pinched between the apertures using the lock.

As illustrated in FIGS. 2, 4 and 10, the biasing means may be a spring 6, which receives spring supporting members 7, 8, belonging to the inner and outer telescoping members, respectively, in opposite ends of the spring. The supporting members 7, 8 function to couple the telescoping members to the spring and to restrict unwanted bending or kinking of the spring during compression when the cord lock is preloaded.

The outer telescoping member 3 is composed of an obverse wall 27 and a reverse wall 28 which are joined together by a pair of side walls 29. The obverse wall 27, reverse wall 28 and side walls 29 of the outer telescoping member 3 define a cavity therein which slidably receives the inner telescoping member 2. As illustrated in FIG. 2, apertures 5 are defined through the obverse and reverse walls.

The cord lock 1 of the invention includes a retaining means for holding the lock in a preloaded condition where the apertures 4, 5 are in substantial alignment to an extent which is sufficient to define an overlap area which is large enough to receive cord 21 therethrough. In the preferred embodiment, the retaining means includes a pair of arms 9, belonging to the inner telescoping member and projecting downward. The arms 9 are elongated as extending from the base of the inner telescoping member 2 to permit some flexing in lateral directions toward the center of the outer telescoping member 3 for reasons explained hereinafter. Each arm 9 includes a pair of wings 10 which project from the arm 9 in the direction toward the obverse wall and the reverse wall of the outer telescoping member. Each wing 10 defines an engagement surface 12 which is normal to the arm 9 to which it belongs. Of course, for each arm 9, the engagement surface 12 of one wing extends from the arm toward the obverse wall 27 of the outer telescoping member 3 and the engagement surface 12 of the opposite wing extends from the arm toward the reverse wall 28 of the outer telescoping member. The projection of the wings 10 and their respective engagement surfaces 12 in the direction toward the obverse wall 27 and the reverse wall 28 of the outer telescoping member is a critical feature of the invention, as will be explained hereinafter.

The side walls 29 of the outer telescoping member 3 are formed with a pair of opposing tabs 13. The tabs are cut from the side walls 29 so as to be flexible and movable relative to the outer telescoping member (see FIG. 2). Each tab may have a projection 14, projecting toward the interior of the outer telescoping member and toward the arms 9 of the inner telescoping member (see FIGS. 8 and 13).

Figure 8:
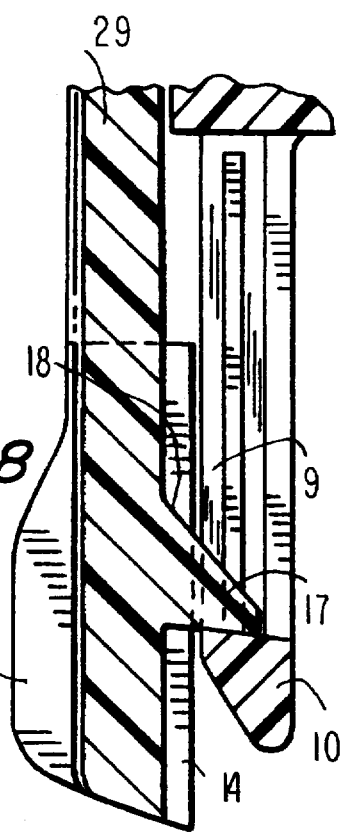
FIG. 8 is a cross-sectional view of the partial view illustrated in FIG. 7, taken along the line 8—8.
Figure 9:
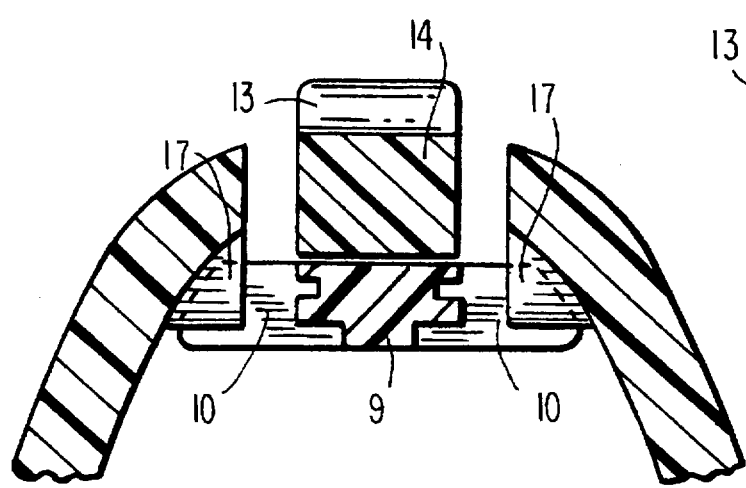
FIG. 9 is a cross-sectional view of the partial view illustrated in FIG. 7, taken along the line 9—9.
Figure 13:
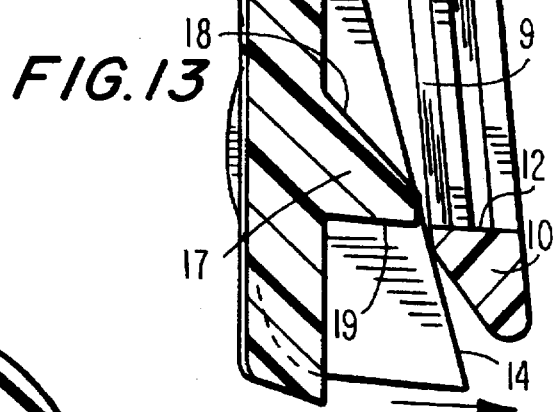
FIG. 13 is a cross-sectional view of the partial view illustrated in FIG. 12, taken along the line 13—13, showing movement of the arms inward.
Figure 14:
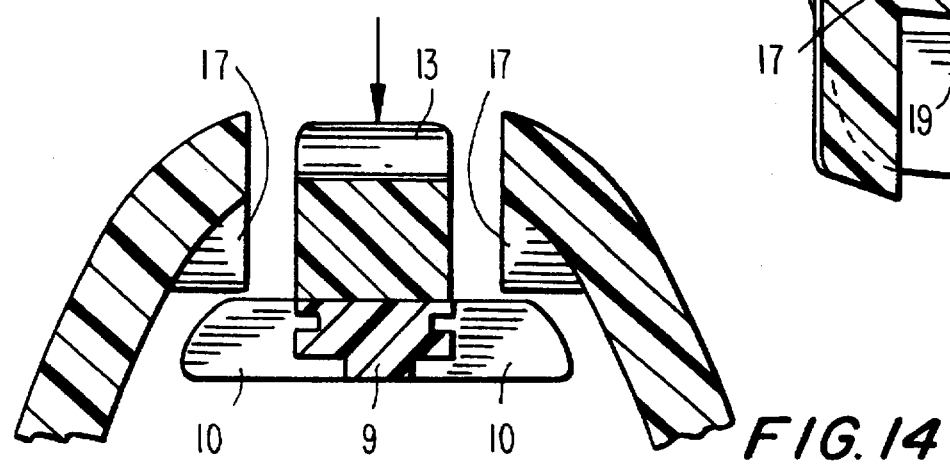
FIG. 14 is a cross-sectional view of the partial view illustrated in FIG. 12, taken along the line 14—14.

The inner surface 16 of each side wall 29 of the outer telescoping member has a pair of engagement projections 17, whose cross-section is preferably that of a right triangle, as illustrated in FIGS. 8 and 13. As illustrated in FIGS. 9 and 14, the individual projections 17 of each pair are disposed on opposite sides of the cut-out tab 13. Each projection 17 includes a first, inclined surface 18 (see FIGS. 8 and 13) which forms an acute angle with a second surface 19 (see FIG. 13), the second surface 19 being substantially normal to the inner surface 16 of the outer telescoping member.

When the device 1 is in an unloaded condition, the apertures 4, 5 of the inner and outer telescoping members will be substantially or completely out of alignment. The spring 6 will urge the telescoping members into this condition. In order to load the device, the inner and outer telescoping members 2, 3 are forced together to compress the spring 6. This drives the arms 9 and wings 10 of the inner telescoping member 2 downward toward the opposed pairs of engagement projections 17 of the outer telescoping member 3. Each wing 10 will engage the first, inclined surface 18 of each projection 17. The surfaces 18 are inclined so that the wings may easily slide past the engagement projections 17. It will be appreciated that the arms 9 are flexible enough to be urged laterally toward the center of the cord lock as the wings 10 traverse each projection 17. Once the engagement surface 12 of each wing has passed by the first, inclined surface 18 of each projection 17, the arms 9 of the inner telescoping member 2 will be free to flex laterally outward in the direction toward the side walls 29 of the outer telescoping member 3, thereby snapping the wings 10 underneath the second surface 19 of the projections 17 (see FIGS. 4, 7, 8 and 9). Although the compressed spring 6 continues to bias the inner telescoping member 2 away from the outer telescoping member 3, the second surface 19 of projections 17 will engage the engagement surface 12 of the wings 10 to prevent the wings from moving back over the projection 17. This condition shall be referred to as the loaded or preloaded condition, and it is illustrated in FIGS. 4, 5, 6, 7, 8 and 9. It should be appreciated that the length of the arms 9 and the position of the projections 17 relative to that of the wings 10 is such that the apertures 4, 5 will be aligned in this loaded condition to an extent which is sufficient to define an area of aperture overlap which is large enough to accommodate a cord to be locked by the device.

Figure 11:
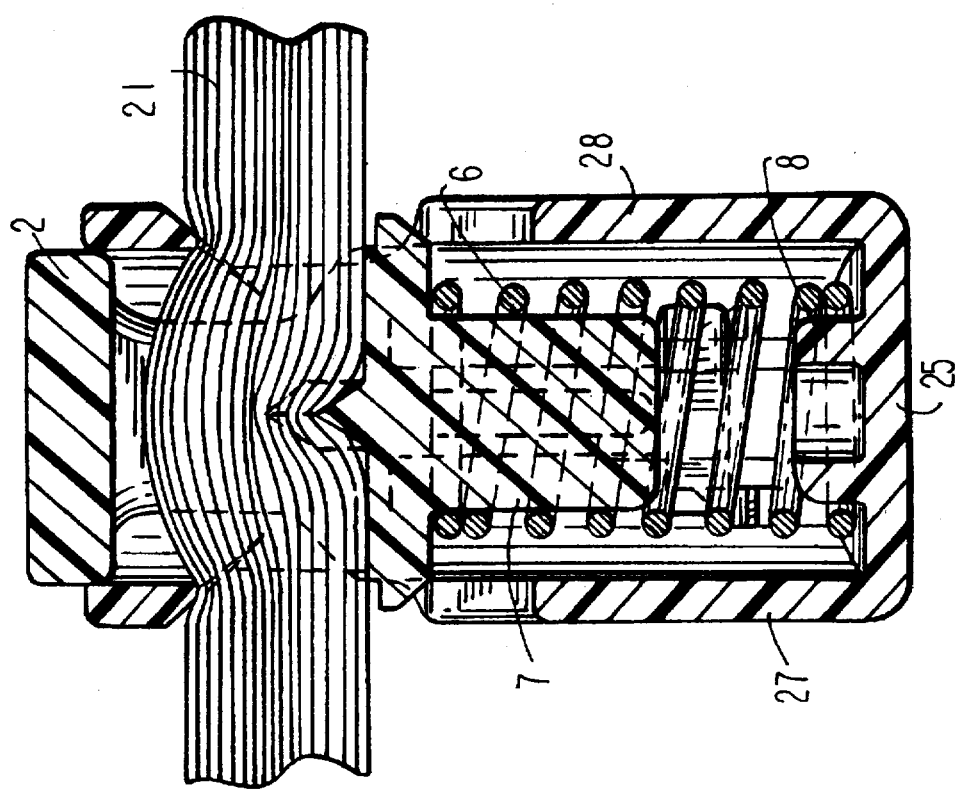
FIG. 11 is a cross-sectional view of the cord lock illustrated in FIG. 10, in the cord locking position, taken along the line 11—11.

It is in this loaded condition that the user may easily thread a cord 21, such as an elastic shock cord, through the apertures. Once the cord 21 is in the desired position, it can be locked in place by pushing inward on the tabs 13 (i.e., squeezing the tabs between two fingers toward the center of the device), as illustrated in FIG. 13 and also in FIG. 10 (in phantom). The inward lateral movement of the projection 14 of each tab 13 will force each wing 10 inward until each engaging surface 12 has cleared the second surface 19 of projection 17 (see FIGS. 13 and 14). The spring 6 will then force the telescoping members 2, 3 apart, thereby clamping the shock cord in the apertures which are continually biased out of alignment. This state will be referred to as the locked condition or cord locking position, and it is illustrated in FIGS. 10 and 11.

In this locked condition, preferably the top of the inner telescoping member 2 does not project out of the top of the outer telescoping member 3. In this way, a person cannot accidentally unlock the device by pushing downward on the inner telescoping member 2 to cause loading. Preferably, the top of the inner telescoping member 2 is substantially flush with the top of the outer telescoping member 3 or is slightly receded therein in the locked condition, as illustrated in FIG. 1. This arrangement prevents accidental unlocking of the device, however, it permits deliberate unlocking of the device as a person would be able to force a fingernail or a pencil or the like, into the outer telescoping member to push the inner telescoping member 2 downward, back to the loaded position where the cord will be free to slide out of the aligned apertures. The cord lock 1 may then be repositioned to a new desired location and relocked by simply pushing inward on the tabs 13.

The top of the outer telescoping member 3 may have a rim (not illustrated) which cooperates with a flange (not illustrated) of the inner telescoping member 2 to restrict the movement of the inner telescoping member relative to the outer telescoping member so as to prevent the two members from becoming completely separated. For this purpose, the spring 6 may also be fixedly attached at each of its ends to the fixing members 7, 8. In order to restrict movement of the inner telescoping member relative to the outer telescoping member in the opposite direction, the outer telescoping member may be provided with stop members (not illustrated) on the inside surface of its bottom wall 25. The stop members will engage the 5 distal end of the arms 9 to prevent further downward movement of the inner telescoping member. Alternatively, tabs 13 and projections 17 may be positioned such that the apertures 4, 5 are aligned when the distal end of arms 9 contact the inner surface of the bottom wall 25 so that no stop members are necessary.

The cord lock of the invention is preferably constructed of a resilient-flexible plastic material to allow for the flexing and snapping cooperation between the arms 9 and the tabs 13. The cord lock is easily molded using conventional molding techniques well known in the art.

In commercial practice, large numbers of cord locks may be advantageously preloaded at the factory prior to their shipment to customers. In this way, the cord locks will be ready for feeding a cord therethrough by the customers.

It will be appreciated by those skilled in the art that a relatively large amount of clamping force must be supplied by the spring 6 of the cord lock in order to securely clamp a cord in place. Of course, this spring force must be overcome by a person who preloads the cord lock. In addition, a person preloading the cord lock must overcome the resistance force which will result from the wings 10 being forced over the engagement projections 17. In the case of a factory worker who preloads large numbers of cord locks prior to shipment, finger muscle fatigue can easily occur.

Figure 15:
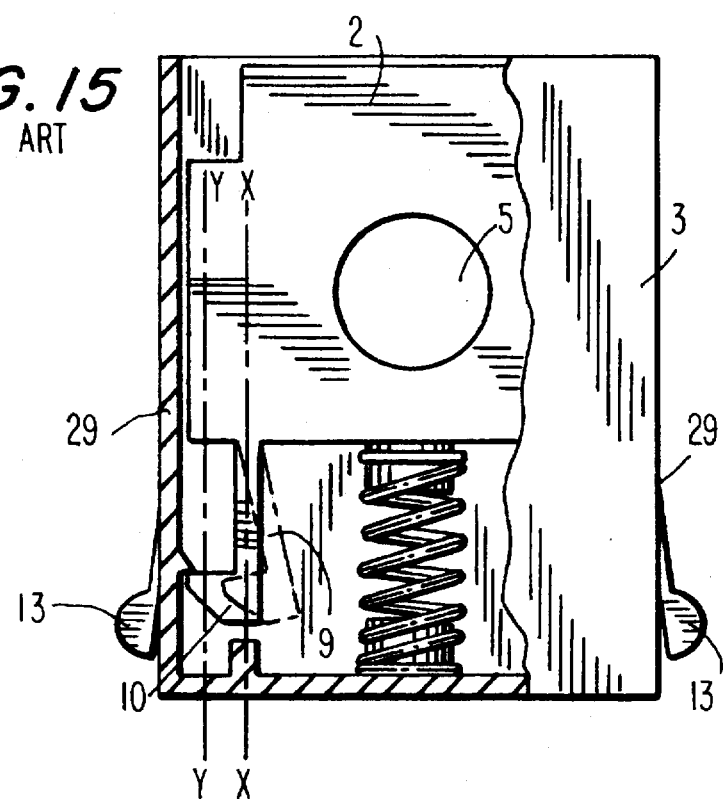
FIG. 15 is a partial cross-sectional view of the prior art cord lock of U.S. Pat. No. 5,361,461 in the preloaded state.
Figure 7:
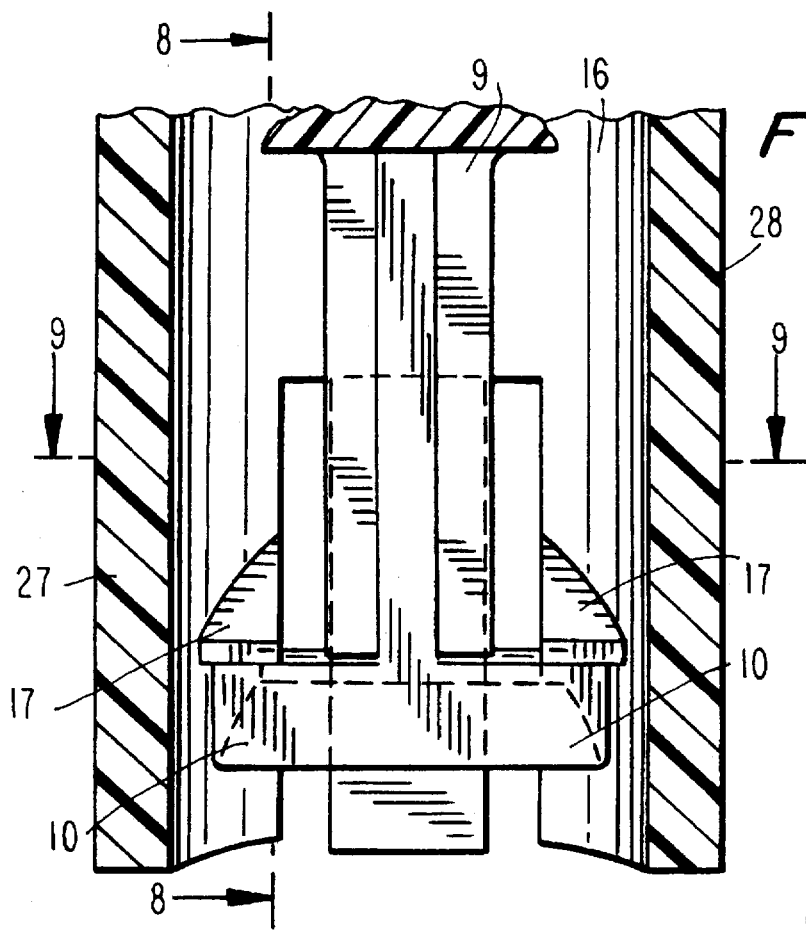
FIG. 7 is a cross-sectional, partial view of the cord lock illustrated in FIG. 4 in the preloaded state, taken along the line 7—7.

An important advantage of the cord lock of the invention is that the amount of force which is required to load the cord lock is reduced as compared to the prior art. This advantage is attributable to the unique positioning of the engagement surfaces 12 of the wings 10 as compared to the prior art. Referring to FIG. 15, in accordance with the prior art, the wings 10 project laterally outward from the arms 9 in the direction toward the side walls 29 of the outer telescoping member 3. In order to load the cord lock of the prior art, a relatively large amount of force is required to force these laterally projecting wings 10 over the engagement projections 17.

On the other hand, the wings 10 of the cord lock of the invention do not need to project laterally outward toward the side walls 29 of the outer telescoping member. Rather, the wings 10 project in the direction toward the obverse wall 27 and the reverse wall 28 of the outer telescoping member.

Thus, when the wings 10 slide over the engagement projections 17 during loading of the cord lock of the invention, the arms 9 will flex inwardly to a lesser extent than they would in the case of the prior art cord lock illustrated in FIG. 15. In this way, less force is required to load or preload the cord lock of the present invention than in the case of the prior art.

Furthermore, it will be appreciated that less force is required to actuate the cord lock of the invention to clamp a cord in place. In order to actuate the cord lock of the prior art, the tabs 13 must be squeezed to force the laterally projecting wings 10 inward until they clear the engagement projections 17. Because the wings 10 project laterally outward toward the side walls 29 of the outer telescoping member, this will require that the arms 9 be forced inward to a certain extent. On the other hand, in order to actuate the cord lock of the present invention, the arms will not need to be forced inward to as great an extent as in the prior art. Therefore, less force will be required to disengage the wings 10 from the engagement projections 17 when actuating the cord lock of the present invention.

A further advantage of the invention is that there is less risk of premature release of the cord lock from the loaded position. Premature release can occur in the prior art cord lock due to the great amount of force exerted by the spring 6. The greater retaining strength of the cord lock of the present invention in the loaded state is due to the alignment of the engagement or retaining force with the force which urges separation of the inner and outer telescoping members. This will now be explained.

Referring to FIG. 15, which illustrates the prior art cord lock in the loaded state, it can be seen that the force exerted by spring 6 which urges separation of the inner and outer telescoping members acts along the longitudinal axis X—X of the arms 9. However, the engagement or retaining force which opposes the separation force acts along the point at which the engagement surfaces 12 of the wings 10 engage the engagement projections 17, along the line Y—Y. Because the engagement surfaces 12 of the wings 10 project laterally outward from the arms 9, the line along which the engagement or retaining force acts Y—Y will be offset from the longitudinal axis X—X of the arms 9, as seen in FIG. 15. Thus, there exists misalignment of the engagement or retaining force with the force tending to urge separation of the inner and outer telescoping members (which acts along the longitudinal axis of each arm 9). Accordingly, as illustrated in FIG. 15, a torque develops between the outer telescoping member and the arms 9 which tends to cause inward rotation of the arms 9. If this rotation is significant enough, it can cause failure of the engagement between the wings 10 and the engagement projections 17, and therefore premature release of the cord lock from the loaded state.

On the other hand, the buckle of the present invention avoids this problem because the engagement or retaining force holding the inner and outer telescoping members together in the loaded state will be aligned, as considered in the width direction, along the longitudinal axis of the arms 9. This is due to the fact that the wings 10 and their engagement surfaces 12 project toward the obverse wall 27 and the reverse wall 28 of the outer telescoping member, rather than to a great extent towards the side walls 29 of the outer telescoping member. Since the line along which the retaining force acts is not offset, in the width direction, from the line along which the force which urges separation of the inner and outer telescoping members acts, no torque will develop and there is less risk of premature release of the cord lock from the loaded state.

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawings are accordingly to be regarded in an illustrative rather than a restrictive sense.

What is claimed is:

1. A loadable cord lock comprising:

an outer telescoping member having an obverse wall, a reverse wall, and a pair of side walls joining the obverse wall and the reverse wall, the outer telescoping member having an aperture defined through its obverse wall and its reverse wall;

an inner telescoping member having an aperture defined therethrough and having at least one arm, the inner member being slidable within the outer member;

engagement means disposed on an inner surface of at least one side wall of the outer telescoping member;

at least one wing projecting from said at least one arm in a direction towards the obverse wall or the reverse wall of the outer telescoping member, said at least one wing defining a shoulder which locks onto said engagement means for retaining the cord lock in a loaded position wherein the aperture of the inner telescoping member is at least partially aligned with the aperture of the outer telescoping member such that the cord lock may receive a cord through an area defined by an overlap of both of said apertures in said loaded position;

a means for biasing said inner and outer members toward a cord locking position wherein the aperture of the inner member is out of alignment with the aperture of the outer member to an extent which is sufficient to pinch a cord threaded through the overlap of the apertures; and a means for disengaging said shoulder from said engagement means.

2. The cord lock according to claim 1 wherein the means for disengaging includes a tab belonging to the outer telescoping member, the tab being movable against said at least one arm or against said wing in the loaded position for forcing the shoulder of the wing clear from the engagement means belonging to the outer telescoping member, thereby allowing the inner telescoping member to move to the cord locking position under force exerted by the biasing means.

3. The cord lock according to claim 1 wherein: the inner telescoping member has a pair of arms; an inner surface of each side wall of the outer telescoping member has an engagement means; each arm has a wing which projects in a direction toward the obverse wall or the reverse wall of the outer telescoping member; and each wing defines a shoulder which locks onto one of said engagement means in the loaded position.

4. The cord lock according to claim 3 wherein each arm has a first wing projecting toward the/obverse wall and a second wing projecting toward the reverse wall, each wing defining a shoulder which locks onto one of said engagement means in the loaded position of the cord lock.

5. The cord lock according to claim 4 wherein each engagement means includes an inclined surface, said inclined surface being adapted for permitting sliding movement of a pair of wings passed the engagement means when the inner and outer telescoping members are moved from the cord locking position to the loaded position.

6. The cord lock according to claim 5 wherein each engagement means further includes a second surface, said second surface being normal to the inner surface of the side wall of the outer telescoping member and said second surface being adapted for engaging the shoulders of one pair of wings in said loaded position for preventing sliding movement of the wings over the engagement means.

7. The cord lock according to claim 1 wherein said biasing means is a spring coupled between said inner and outer telescoping members, said spring being compressible to a compressed position in said loaded position of the cord lock.

8. The cord lock according to claim 1 wherein said inner telescoping member is entirely receded within said outer telescoping member in said loaded position and in said cord locking position.

9. A loadable cord lock comprising:

an outer telescoping member having an aperture defined therethrough;

an engagement means belonging to the outer telescoping member;

an inner telescoping member having an aperture defined therethrough, the inner member being slidable within the outer member;

at least one arm belonging to the inner telescoping member, said at least one arm having a lateral width and having a longitudinal axis extending longitudinally through said at least one arm;

shoulder means belonging to said at least one arm for releasable locking engagement with said engagement means of the outer telescoping member and for retaining the cord lock in a loaded position where the aperture of the inner member is at least partially aligned with the aperture of the outer member such that the cord lock may receive a cord through an area defined by an overlap of both of said apertures in said loaded position, said shoulder means being disposed on said at least one arm such that the shoulder means engages the engagement means in the loaded position to provide a retaining force which acts in opposition to and in alignment with, as considered in said width direction, said longitudinal axis of said at least one arm;

a means for biasing said inner and outer members toward a cord locking position where the aperture of the inner member is out of alignment with the aperture of the outer member to an extent which is sufficient to pinch a cord threaded through the overlap of the apertures; and a means for disengaging said shoulder means from said engagement means.

10. The cord lock according to claim 9, wherein the means for disengaging includes a tab belonging to the outer telescoping member, the tab being movable against said shoulder means or against said at least one arm in the loaded position for forcing the shoulder means of the at least one arm clear from the engagement means belonging to the outer telescoping member, thereby allowing the inner telescoping member to move to the cord locking position under force exerted by the biasing means.

11. The cord lock according to claim 10, wherein the engagement means belonging to the outer telescoping member includes a pair of projections disposed on opposite sides of said tab.

12. The cord lock according to claim 9 wherein: the inner telescoping member has a pair of arms; an inner surface of each side wall of the outer telescoping member has an engagement means; each arm has a wing which projects in a direction toward an obverse wall or a reverse wall of the outer telescoping member; and each wing defines a shoulder which locks onto one of said engagement means in the loaded position.

* * * * *